US011691355B2

(12) United States Patent
Liu et al.

(10) Patent No.: US 11,691,355 B2
(45) Date of Patent: Jul. 4, 2023

(54) 3D SPACER FABRIC REINFORCED PU COMPOSITE AND ITS USE

(71) Applicant: BASF SE, Ludwigshafen am Rhein (DE)

(72) Inventors: YingHao Liu, Shanghai (CN); Feng Chao Hu, Shanghai (CN); Tao Liu, Solna (SE); Hairu Long, Shanghai (CN); Si Chen, Shanghai (CN); Daniel Freidank, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 653 days.

(21) Appl. No.: 16/342,593

(22) PCT Filed: Oct. 13, 2017

(86) PCT No.: PCT/EP2017/076153
§ 371 (c)(1),
(2) Date: Apr. 17, 2019

(87) PCT Pub. No.: WO2018/073109
PCT Pub. Date: Apr. 26, 2018

(65) Prior Publication Data
US 2019/0255783 A1   Aug. 22, 2019

(30) Foreign Application Priority Data

Oct. 17, 2016   (WO) .............. PCT/CN2016/000574

(51) Int. Cl.
*C08G 18/66* (2006.01)
*B29C 70/24* (2006.01)
*B29C 70/48* (2006.01)
*B29D 35/12* (2010.01)
*C08G 18/42* (2006.01)
*C08G 18/48* (2006.01)
*D04B 21/16* (2006.01)
*C08G 18/20* (2006.01)
*B29C 44/12* (2006.01)
*C08G 18/32* (2006.01)
*B29C 70/04* (2006.01)
*B29K 75/00* (2006.01)
*B29K 267/00* (2006.01)

(52) U.S. Cl.
CPC .......... *B29C 70/24* (2013.01); *B29C 44/1276* (2013.01); *B29C 70/04* (2013.01); *B29C 70/48* (2013.01); *B29D 35/122* (2013.01); *C08G 18/2063* (2013.01); *C08G 18/3206* (2013.01); *C08G 18/3275* (2013.01); *C08G 18/42* (2013.01); *C08G 18/4291* (2013.01); *C08G 18/4854* (2013.01); *C08G 18/664* (2013.01); *C08G 18/6688* (2013.01); *D04B 21/16* (2013.01); *B29K 2075/00* (2013.01); *B29K 2267/003* (2013.01); *B29K 2267/006* (2013.01); *B29K 2313/00* (2013.01); *B29K 2995/0094* (2013.01); *C08G 2110/0083* (2021.01); *C08G 2410/00* (2013.01); *D10B 2401/08* (2013.01); *D10B 2403/021* (2013.01); *D10B 2501/043* (2013.01)

(58) Field of Classification Search
CPC ..... B29C 44/1276; B29C 70/04; B29C 70/24; B29C 70/48; B29D 35/122; B29K 2075/00; B29K 2267/003; B29K 2267/006; B29K 2313/00; B29K 2995/0094; C08G 18/2063; C08G 18/3206; C08G 18/3275; C08G 18/42; C08G 18/4291; C08G 18/48; C08G 18/4854; C08G 18/664; C08G 18/6688; C08G 2110/0083; C08G 2410/00; C08J 9/0085; C08J 9/04; D04B 21/16; D10B 2401/08; D10B 2403/021; D10B 2501/043
See application file for complete search history.

(56) References Cited

U.S. PATENT DOCUMENTS

| 5,385,036 A * | 1/1995 | Spillane ............... A43B 1/04 2/16 |
| 6,858,655 B1 | 2/2005 | Hofmann et al. |
| 2013/0197118 A1* | 8/2013 | Bollmann ............... C08J 9/02 521/172 |

FOREIGN PATENT DOCUMENTS

| EP | 1194468 A1 * | 4/2002 | ......... C08G 65/2663 |
| FR | 1393269 A | 3/1965 | |
| GB | 1425088 A | 2/1976 | |
| JP | S4728908 U | 12/1972 | |
| JP | S5151501 A | 5/1976 | |
| JP | H05269899 A | 10/1993 | |
| WO | 2011054638 A9 | 6/2011 | |

OTHER PUBLICATIONS

Chen, et al., "Investigation on compression properties of polyurethane-based warp-knitted spacer fabric composites for cushioning applications Part I. Experiment", Industria Textila, vol. 65, Issue 4, 2014, pp. 200-205.

Hosur, et al., "Dynamic compression behavior of integrated core sandwich composites", Materials Science and Engineering: A, vol. 445-446, Feb. 15, 2007, pp. 54-64.

(Continued)

*Primary Examiner* — John M Cooney

(74) *Attorney, Agent, or Firm* — Armstrong Teasdale LLP

(57) ABSTRACT

Described herein is a 3D spacer fabric reinforced composite, a process for producing it, a method of using it in footwear, and a footwear including it.

19 Claims, No Drawings

(56) References Cited

OTHER PUBLICATIONS

Schaefer, et al., "Ein starkender Zusammenschluss Verbundstrukturen aus 3D-Gewirke und Polyurethanschaumstoff mit bemerkenswerter Verstarkungswirkung", Kettenwirk-Praxis, Karl Mayer, Obertshausen, 2014, pp. 34-36. (Cited in ISR of International Patent Application No. PCT/EP2017/079153; no English Translation available).

International Search Report and Written Opinion for International Application No. PCT/EP2017/076153, dated Jan. 19, 2018, 10 pages.

Chen et al., "Mechanical properties of 3d-structure composites based on warp-knitted spacer fabrics", AUTEX Research Journal, Published Jun. 26, 2015, pp. 127-137, vol. 15, No. 2.

Wang et al: "Influence of Panel Density on the Shear and Peel Property of Sandwich Composites", Advanced Materials Research, Published Mar. 12, 2014, pp. 63-66, vol. 904.

Arthur Price et. al. translated by Chengyan Zhu, "Fabric Science", p. 200, China Textile Publishing House, Beijing, Feb. 2003.

Shuyun Li, "Shoe Sole Formula Design and Production Process", pp. 256-260, Sichuan Science and Technology Press, Chengdu, Sep. 1985.

\* cited by examiner

3D SPACER FABRIC REINFORCED PU COMPOSITE AND ITS USE

CROSS-REFERENCE TO RELATED APPLICATIONS

This application is a U.S. National Phase Application of PCT/EP2017/076153, filed Oct. 13, 2017, which claims the benefit of priority to International Patent Application No. PCT/CN2016/000574, filed Oct. 17, 2016, the entire contents of which are hereby incorporated by reference herein.

TECHNICAL FIELD OF THE INVENTION

The present invention is directed to a 3D spacer fabric reinforced PU composite, a process for producing it, its use in a footwear, in particularly in a shoe sole, and a footwear, in particularly a shoe sole comprising it.

BACKGROUND OF THE INVENTION

Polyurethane (PU) foam is an important material and is widely used in various fields. PU foam possesses excellent properties, such as a good thermal insulating property, lightweight, high specific strength, and easiness to handle, etc. Moreover, PU foam has characteristics such as thermal, sound and electrical insulating properties, resistance to heat and solvents, etc. Thus, PU foam is widely used for example as thermal insulating materials in refrigerators and industrial equipments such as storage vessels and pipelines, as construction materials, in vehicles such as ceilings, and as interior trims in cars.

More particularly, PU foam is used in a footwear as a shoe sole because of the characteristics of lightweight and abrasion. However, the PU foams known from the prior art have certain disadvantages, such as a poor abrasion resistance and a low tear strength, which limit their use in the footwear, especially in the low density PU shoe sole. Moreover, the polyether polyol based PUs known from the prior art have a disadvantage of a poor abrasion resistance, which makes the polyether polyol based PUs to be rarely used as the outsole. Thus, there is still a room for further improving the PU foams useful as shoe sole.

On the other hand, 3D spacer fabric, also known as warp-knitted spacer fabric, is a novel three-dimensional textile consisting of two separate outer fabric layers which are connected together by spacer yarns. The 3D spacer fabric has been recently used for fabrication of a 3D structure composite. The composite made from the 3D spacer fabric has the following advantages: (1) the composite can be fabricated in one single step instead of by a complicated manufacturing process; (2) the two outer layers of the fabric are bound by the spacer yarns, thus the face-core delamination hardly occurs; (3) the hollow core can be filled with a variety of materials. Therefore, the integrated 3D-structure composite are widely used for automobile, vehicles, marine and so on.

Si Chen et. al., Mechanical properties of 3d-structure composites based on warp-knitted spacer fabrics, AUTEX Research Journal, Vol. 15, No. 2, June 2015, DOI: 10.2478/aut-2014-0045, pages 127-137 discloses a 3D-structured composite prepared by impregnating a warp-knitted spacer fabric with a PU foam. The document fails to disclose the specific composition of the PU foam and the use of the resulted 3D composite in footwear. Actually, the 3D composite cannot be used in the shoe application due to its low mechanical properties.

Si Chen and Hai-Ru Long, Investigation on compression properties of PU-based warp-knitted spacer fabric composites for cushioning applications, Part I. Experiment, Industria Textilă, 2014, Vol. 65, No. 4, pages 200-205 also discloses a PU-based warp-knitted spacer fabric composite. This document also fails to disclose the specific composition of the PU foam and the use of the resulted composite in the footwear. Actually, the obtained composition cannot be used in the shoe application due to the improper mechanical properties, especially the flexibility, elongation and hardness.

The prior art has not disclosed the use of the 3D spacer fabric reinforced PU composite in the footwear, in particularly in the shoe sole.

The inventors have surprisingly found that comparing with the pure foam, by using specific PU foam in combination with the 3D spacer fabric, a 3D spacer fabric reinforced PU composite which shows improved mechanical performances and unique properties such as unique anisotropic effect and thus possesses a great potential in the footwear application was obtained. Based on this discovery, the inventors have finished the present invention.

SUMMARY OF THE INVENTION

Thus, an object of the invention is to provide a 3D spacer fabric reinforced PU composite. The composite shows improved mechanical performances and unique properties such as unique anisotropic effect, which make them suitable for use in a footwear, in particularly in a shoe sole.

Another object of the present invention is the use of the 3D spacer fabric reinforced PU composite in a footwear, in particularly in a shoe sole.

DETAILED DESCRIPTION OF THE INVENTION

In one aspect, the present invention is directed to a 3D spacer fabric reinforced PU composite.

The 3D spacer fabric used in the present invention has been already known in the prior art. The 3D spacer fabric generally comprises a first or top layer of material that is separated from a generally parallel second or bottom layer of material by spacer yarns.

The 3D spacer fabric is generally produced by double needle bar Raschel warp knitting machines. The double needle bar Raschel warp knitting machines are basically equipped with two independently operated needle bars fed with multiple warps of yarns from a plurality of respective warp beams through a corresponding plurality of yarn guide bars. The 3D spacer fabric is typically produced from five or more sets of warp yarns separately wound on individual warp beams and fed to the two needle bars through a corresponding set of yarn guide bars, normally with at least two sets of warp yarns fed through two corresponding guide bars being exclusively fed to one of the needle bars to fabricate one ground layer, at least two other sets of warp yarns fed through other corresponding guide bars being exclusively fed to the other needle bar to fabricate the other ground layer, and the remaining sets of warp yarns fed through one or more of the remaining available guide bars being alternately fed to the two needle bars to extend between and interknit with the two ground layers and thereby to integrate and maintain the ground structures in spaced-apart essentially parallel relation.

The top layer and/or the bottom layer may have various surface structures, such Chain+Inlay, Locknit or Hexagonal Mesh.

The fibers used to construct the 3D spacer fabric could be made from any material that provides the desired properties. By varying the raw material, the density of the fabric and its properties could be tailored to suit for the particular application. In the context of the present invention, the fabric may be made from, for example, polyethylene terephthalate (PET), polybutylene terephalate (PBT), nylon, polyacrylonitrile, etc., more preferably PET and PBT, most preferably PET. Of course, the 3D spacer fabric could be made from any combination of these materials and could further comprise other materials.

The diameter of the spacer yarns used to construct the 3D spacer fabric is not critical, but is preferably from about 0.05 to about 0.5 mm, more preferably from about 0.10 to about 0.4 mm, even more preferably from about 0.15 to about 0.3 mm, most preferably from about 0.15 to about 0.25 mm.

It has been found that the inclination angle of the spacer yarns would affect the mechanical properties of the resulted 3D spacer fabric reinforced PU composites. In the context of the present invention, "the inclination angle of the spacer yarns" is defined as the angle of the spacer yarns in respect to the top or bottom layer of the fabric. The angle influences the anisotropic effect, and there will be no anisotropic effect without this angle. The inclination angle of the spacer yarns may be from about 40 to about 85°, preferably from about 50 to about 80°, more preferably from about 60 to about 80°, even more preferably from about 65 to about 80°, most preferably from about 65 to about 75°.

The thickness of the 3D spacer fabric can be optimized according to the actual application, especially according to the desired thickness of the footwear, and is generally from about 2 to about 15 mm, preferably from about 3 to about 12 mm, more preferably from about 5 to about 10 mm, most preferably from about 5.5 to about 8 mm.

The PU foam used in the present invention is prepared by reacting the follow components,
(a) a di- or polyisocyanate,
(b) a polyether polyol or polyester polyol, and
(c) optionally a blowing agent.

The di- or polyisocyanates used can be any of the aliphatic, cycloaliphatic, or aromatic isocyanates known for producing PUs. Examples are diphenylmethane 2,2'-, 2,4'-, and 4,4'-diisocyanate, the mixtures of monomeric diphenylmethane diisocyanates and of diphenylmethane diisocyanate homologs having a greater number of rings (polymeric MDI), isophorone diisocyanate (IPDI) or its oligomers, tolylene diisocyanate (TDI), for example tolylene diisoyanate isomers such as tolylene 2,4- or 2,6-diisocyanate, or a mixture of these, tetramethylene diisocyanate or its oligomers, hexamethylene diisocyanate (HDI) or its oligomers, naphthylene diisocyanate (NDI), or a mixture thereof.

The di- or polyisocyanates used preferably comprise isocyanates based on diphenylmethane diisocyanate, in particular comprising polymeric MDI. The functionality of the di- or polyisocyanates is preferably from 2.0 to 2.9, particularly preferably from 2.1 to 2.8. The viscosity of the di- or polyisocyanates at 25° C. to DIN 53019-1 to 3 is preferably from about 5 to about 600 mPas and particularly preferably from about 10 to about 300 mPas.

Di- and polyisocyanates can also be used in the form of polyisocyanate prepolymers. These polyisocyanate prepolymers are obtainable by reacting an excess of the polyisocyanates described above with compounds having at least two groups reactive toward isocyanates, for example at temperatures of from 30 to 100° C., preferably at about 80° C., to give the prepolymer. The NCO content of polyisocyanate prepolymers of the invention is preferably from 10 to 33% by weight of NCO, particularly preferably from 15 to 25% by weight of NCO.

The polyether polyols used to prepare the PU foam are obtained by known methods, for example by anionic polymerization of alkylene oxides with addition of at least one starter molecule which comprises from 2 to 8, preferably from 2 to 6, reactive hydrogen atoms in bound form in the presence of catalysts. As catalysts, it is possible to use alkali metal hydroxides such as sodium or potassium hydroxide or alkali metal alkoxides such as sodium methoxide, sodium or potassium ethoxide or potassium isopropoxide or, in the case of cationic polymerization, Lewis acids such as antimony pentachloride, boron trifluoride etherate or bleaching earth as catalysts. Furthermore, double metal cyanide compounds, known as DMC catalysts, can also be used as catalysts.

As alkylene oxides, preference is given to using one or more compounds having from 2 to 4 carbon atoms in the alkylene radical, e.g. ethylene oxide, 1,3-propylene oxide, tetrahydrofuran, 1,2- or 2,3-butylene oxide, in each case either alone or in the form of mixtures, and preferably ethylene oxide and/or 1,2-propylene oxide.

Possible starter molecules are, for example, ethylene glycol, diethylene glycol, glycerol, trimethylolpropane, pentaerythritol, sugar derivatives such as sucrose, sugar alcohol such as sorbitol, methylamine, ethylamine, isopropylamine, butylamine, benzylamine, aniline, toluidine, toluenediamine, naphthylamine, ethylenediamine, diethylenetriamine, 4,4'-methylenedianiline, 1,3-propanediamine, 1,6-hexanediamine, ethanolamine, diethanolamine, triethanolamine and other dihydric or polyhydric alcohols or monofunctional or polyfunctional amines.

The polyester polyol is usually prepared by condensation of polyfunctional alcohols having from 2 to 12 carbon atoms, e.g. ethylene glycol, diethylene glycol, butanediol, trimethylolpropane, glycerol or pentaerythritol, with polyfunctional carboxylic acids having from 2 to 12 carbon atoms, for example succinic acid, glutaric acid, adipic acid, suberic acid, azelaic acid, sebacic acid, decanedicarboxylic acid, maleic acid, fumaric acid, phthalic acid, isophthalic acid, terephthalic acid, the isomers of naphthalenedicarboxylic acids or the anhydrides of the acids mentioned. The polyfunctional carboxylic acid also includes other sources of dicarboxylic acids like dimethylterephthalate (DMT), polyethyleneglycol-terephthalate (PET) and the like.

The polyether polyol or the polyester polyol used herein has a functionality of from about 1.7 to about 2.5, preferably from about 1.8 to about 2.4, more preferably from about 1.8 to about 2.3. Moreover, the polyether polyol or the polyester polyol used herein has a hydroxyl number of from about 50 to about 270 mg KOH/g, preferably from about 55 to about 200 mg KOH/g, more preferably from about 55 to about 150 mg KOH/g, even more preferably from about 55 to about 100 mg KOH/g, most preferably from about 55 to about 80 mg KOH/g. It was surprising to find that when the functionality and the hydroxyl number of the polyether polyol or the polyester polyol fall into the ranges mentioned-above, a 3D spacer fabric reinforced PU composite with high mechanical properties and unique anisotropic effect was obtained, which made the composite to be suitable to use in the footwear, in particularly the shoe sole.

The molecular weight of the polyether polyol or the polyester polyol is from about 500 to about 6000, preferably from about 600 to about 4000, more preferably from about 1000 to about 2500. Moreover, the polydispersion index of the polyether polyol or polyester polyol is within a specific range, such as from about 0.8 to about 1.3, preferably from about 0.9 to about 1.2, more preferably from about 0.95 to about 1.1. Within the mentioned polydispersion index, the obtained composite has the best balance between hardness and flexibility.

The reaction mixture used to prepare the PU foam may further comprise a crosslinker and/or a chain extender.

As the chain extender and/or crosslinker, use is made of, in particular, bifunctional or trifunctional amines and alcohols, in particular diols, triols or both, in each case having molecular weights of less than 350, preferably from 60 to 300 and in particular from 60 to 250. Here, bifunctional compounds are referred to as chain extenders and trifunctional or higher-functional compounds are referred to as crosslinkers. It is possible to use, for example, aliphatic, cycloaliphatic and/or aromatic diols having from 2 to 14, preferably from 2 to 10, carbon atoms, e.g. ethylene glycol, 1,2-, 1,3-propanediol, 1,2-, 1,3-pentanediol, 1,10-decanediol, 1,2-, 1,3-, 1,4-dihydroxycyclohexane, diethylene glycol and triethylene glycol, dipropylene glycol and tripropylene glycol, 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-comprising polyalkylene oxides based on ethylene oxide and/or 1,2-propylene oxide and the abovementioned diols and/or triols as starter molecules.

The chain extender can be an individual compound or a mixture. The chain extender preferably comprises propylene glycol, dipropylene glycol, tripropylene glycol and/or 2,3-butanediol either alone or optionally in mixtures with one another or with further chain extenders. Thus, in a particularly preferred embodiment, dipropylene glycol is used together with a second chain extender, for example 2,3-butanediol, mono-propylene glycol or diethylene glycol, as chain extender.

The crosslinker is preferably 1,2,4-, 1,3,5-trihydroxycyclohexane, glycerol and/or trimethylolpropane. Preference is given to using glycerol as crosslinker.

The reaction mixture used to prepare the PU foam may further comprise a blowing agent. The blow agent may be physical blowing agent or chemical blowing agent.

The physical blowing agents are compounds which are inert toward the starting components and are usually liquid at room temperature and vaporize under the conditions of the urethane reaction. The boiling point of these compounds is preferably below 50° C. Physical blowing agents also include compounds which are gaseous at room temperature and are introduced into or dissolved in the starting components under pressure, for example carbon dioxide, low-boiling alkanes, fluoroalkanes and fluoroolefins.

The physical blowing agents are usually selected from the group consisting of alkanes and cycloalkanes having at least 4 carbon atoms, dialkyl ethers, esters, ketones, acetals, fluoroalkanes, fluoroolefins having from 1 to 8 carbon atoms and tetraalkylsilanes having from 1 to 3 carbon atoms in the alkyl chain, in particular tetramethylsilane.

Examples which may be mentioned are propane, n-butane, isobutane and cyclobutane, n-pentane, isopentane and cyclopentane, cyclohexane, dimethyl ether, methyl ethyl ether, methyl butyl ether, methyl formate, acetone and fluoroalkanes which can be degraded in the troposphere and therefore do not damage the ozone layer, e.g. trifluoromethane, difluoromethane, 1,1,1,3,3-pentafluorobutane, 1,1,1,3, 3-pentafluoropropane, 1,1,1,2-tetrafluoroethane, difluoroethane and heptafluoropropane. Examples of fluoroolefins are 1-chloro-3,3,3-trifluoropropene, 1,1,1,4,4,4-hexafluorobutene. The physical blowing agents mentioned can be used alone or in any combinations with one another. Preference is given to using 1,1,1,3,3-pentafluoropropane as HFC-245fa from Honeywell International Inc., 1-chloro-3, 3,3-trifluoropropene as HCFO-LBA2 from Honeywell International Inc. or as AFA-L1 from Arkema SA, 1,1,1,4,4,4-hexafluorobutene as HFO FEA1100 from Dupont.

The physical blowing agent (c) is used in such an amount that the density of the PU foam is, without taking into account the reinforcing material, preferably in the range from about 75 to about 150 kg/m$^3$, more preferably from about 90 to about 130 kg/m$^3$, most preferably from about 100 to about 110 kg/m$^3$.

As chemical blowing agents, water and/or formic acid could be used. These react with isocyanate groups with elimination of carbon dioxide or, respectively, carbon dioxide and carbon monoxide. In one embodiment, water is preferably used as the blowing agent. The amount of water is preferred in a range of 0.1 to 2.0% by weight, based on the weight of the reaction mixture.

According to the present invention, the reaction for forming the PU foam is carried out in the presence of a catalyst (d).

As catalysts (d), it is possible to use all compounds which accelerate the isocyanate-polyol reaction. Such compounds are known and are described, for example, in "Kunststoffhandbuch, volume 7, PU", Carl Hanser Verlag, 3$^{rd}$ edition 1993, chapter 3.4.1. These comprise amine-based catalysts and catalysts based on organic metal compounds.

As catalysts based on organic metal compounds, it is possible to use, for example, organic tin compounds such as tin(II) salts of organic carboxylic acids, e.g. tin(II) acetate, tin(II) octoate, tin(II) ethylhexanoate and tin(II) laurate, and the dialkyltin(IV) salts of organic carboxylic acids, e.g. dibutyltin diacetate, dibutyltin dilaurate, dibutyltin maleate and dioctyltin diacetate, and also bismuth carboxylates e.g. bismuth(III) neodecanoate, bismuth 2-ethylhexanoate and bismuth octanoate, or alkali metal salts of carboxylic acids, e.g. potassium acetate or potassium formate.

Preference is given to using a tertiary amine or a mixture comprising at least one tertiary amine as catalyst (d). These tertiary amines are usually compounds which can also bear groups which are reactive toward isocyanate, e.g. OH, NH or NH$_2$ groups. Some of the most frequently used catalysts are bis(2-dimethylaminoethyl) ether, N,N,N,N,N-pentamethyldiethylenetriamine, N,N,N-triethylaminoethoxyethanol, dimethylcyclohexylamine, dimethylbenzylamine, triethylamine, triethylenediamine, pentamethyldipropylenetriamine, dimethylethanolamine, N-methylimidazole, N-ethylimidazole, tetramethylhexamethylenediamine, tris(dimethylaminopropyl)hexahydrotriazine, dimethylaminopropylamine, N-ethylmorpholine, diazabicycloundecene and diazabicyclononene.

According to the present invention, the reaction for forming the PU foam is carried out in the presence of one or more foam stabilizer (e).

The term foam stabilizer refers to materials which promote formation of a regular cell structure during foam formation. Examples which may be mentioned are: silicon-comprising foam stabilizers such as siloxane-oxyalkylene copolymers and other organopolysiloxanes. Alkoxylation products of fatty alcohols, oxo alcohols, fatty amines, alkylphenols, dialkylphenols, alkylcresols, alkylresorcinol, naphthol, alkylnaphthol, naphthylamine, aniline, alkylaniline, toluidine, bisphenol A, alkylated bisphenol A, polyvinyl alcohol and also further alkoxylation products of condensation products of formaldehyde and alkylphenols, formaldehyde and dialkylphenols, formaldehyde and alkylcresols, formaldehyde and alkylresorcinol, formaldehyde and aniline, formaldehyde and toluidine, formaldehyde and naphthol, formaldehyde and alkylnaphthol and also formaldehyde and bisphenol A or mixtures of two or more of these foam stabilizers can also be used.

Foam stabilizers are preferably used in an amount of from about 0.5 to about 4% by weight, particularly preferably from about 1 to about 3% by weight, based on the total weight of the PU foam.

In one embodiment, the reaction for forming the PU foam is carried out in the presence of further additives and/or auxiliaries (f).

Auxiliaries and/or additives which may be used are substances known per se for this purpose, e.g. surfactants, foam stabilizers, cell regulators, fillers, pigments, dyes, antioxidants, hydrolysis stabilizers, antistatic agents, fungi static agents, and bacteriostatic agents.

Further details concerning the starting materials used for carrying out the inventive process, blowing agents, catalysts, and also auxiliaries and/or additives are found by way of example in Kunststoffhandbuch [Plastics Handbook], volume 7, "PU" ["PUs"] Carl-Hanser-Verlag Munich, 1st edition, 1966, 2nd edition, 1983, and 3rd edition, 1993.

The PU foam is in-situ formed during the preparation of the reinforced material.

The 3D fabric reinforced PU composite of the present invention has improved mechanical properties over the unreinforced PU foam. More particularly, the 3D fabric reinforced PU composite of the present invention has an improved tensile strength, and especially greatly improved tear strength.

More importantly, the 3D fabric reinforced PU composite of the present invention has a unique anisotropy. In the context of the present invention, "anisotropy" is intended to mean that the 3D fabric reinforced PU composite possesses different properties in different directions. For example, the mechanic properties in the direction perpendicular to the spacer yarns are superior to the other two directions perpendicular to it.

The above-mentioned improved mechanical properties and the anisotropy make the present 3D fabric reinforced PU composite to be useful in the footwear, in particularly in the shoe sole. The improved mechanical properties prolong the sole life, and the anisotropy helps to make the ankle to be stable and comfort during walking or running. The appearance of this composite also allows the freedom for design of the shoes.

In another aspect, the present invention is directed to a process for preparing the 3D spacer fabric reinforced PU composite of the present invention, which comprises adding the 3D spacer fabric and the starting materials of the PU composite into a mould and then foaming.

Before adding into the mould, the starting materials of the PU foam were mixed firstly with a mixing apparatus such as a vollrath mixer.

The dosing sequence of the 3D spacer fabric and the mixed starting materials of the PU foam is not critical. Actually, it is possible to add the fabric into the mould firstly, then add the starting materials of the PU foam, or it is possible to add the starting materials of the PU foam into the mould firstly, then add the fabric, or it is possible to stick the fabric onto the inner surface (up and bottom) of the mould, then add the starting materials of the PU foam.

In particularly, the 3D spacer fabric reinforced PU composite is formed by mixing the reaction mixture for preparing the PU foam, then infusing the mixture into the 3D spacer fabric. More particularly, the first step is to mix all the components for preparing the PU foam together homogeneously. Afterwards, the mixture is infused into a mould in which the 3D spacer fabric has been already put. The infusion may be carried out by using vacuum-assisted resin transfer molding (VARTM) or by direct casting. In this regard, it is surprising to find that by using the specific formulation of the PU foam of the present invention, the raw materials for forming the PU foam can be directly, i.e., without using any assistant equipment such as vacuum-assisted infusion equipments, infused into the mould in which the 3D spacer fabric has been already put. This makes the infusion to be easier and reduces the manufacturing cost.

The infusion could be carried out in such a way that the reaction mixture for preparing the PU foam flows through the 3D spacer fabric in the spacer yarn direction. During the preparation, the top and bottom surfaces of the mould can be heated, such as by electricity or a water bath heating system. The temperature during the infusion is from about 20 to about 50° C. Simultaneously with the forming of the composite, the PU foams. After the infusion, the temperature is maintained for a certain time, such as about 5 to about 30 minutes, in order to continue foaming. After foaming, the composite is removed from the mould and is left to stand still for a certain time, such as about 8 to about 32 hours, preferably about 10 to about 24 hours, until the composite is stable.

It has been found that the composite of the present invention possesses improved mechanical performances and unique properties such as unique anisotropic effect. For footwear, in particularly a shoe sole, it is generally required to bend easily up and down at the part corresponding to the foot arch, while not deform easily in the horizontal planes. Therefore, the unique anisotropic effect of the composite of the present invention makes it to be highly suitable for use in the footwear, especially the shoe sole. Moreover, the improved mechanical performances of the composite of the present invention make the resulted footwear, especially the shoe sole to possess high mechanical performances.

Therefore, in a further aspect, the present invention is directed to the use of the 3D spacer fabric reinforced PU composite of the present invention in a footwear, in particularly in a shoe sole.

In a further aspect, the present invention is directed to a footwear, in particularly a shoe sole comprising the 3D spacer fabric reinforced PU composite according to the present invention.

When preparing the shoe sole, the 3D fabric is put into the raw material of the PU foam in the mould in such a way that the direction of the spacer yarns constitutes the thickness direction of the resulted shoe sole, while the top and bottom layers of the fabric are parallel to the top and bottom of the resulted shoe sole. In this case, when walking or running, the sole would bend up and down, i.e., in the direction of perpendicular to the spacer yarns, while in another two directions, the sole would not deform easily.

Further embodiments of the present invention are described in the claims, the description and the examples. It goes without saying that the features mentioned above and features still to be explained below can be used not only in the combination indicated in each case but also in other combinations without going outside the scope of the invention.

The advantages of the invention are illustrated by the following examples.

EXAMPLES

1. Measuring Method

During the experiments, the flexibility, density, hardness and the mechanical properties of the 3D fabric reinforced PU composite are measured.

The density of the 3D fabric reinforced PU composite is measured from the top layer to the sole layer by using DPX300 LTE density Analyzer. According to the test standard, samples with size of 5 cm (Length)×5 cm (Width)×1 cm (Thickness) should be prepared, then put into chamber and scanned by X-ray. Thus, the density distribution chart will be obtained.

The hardness of the 3D fabric reinforced PU composite is measured according to the test standard of ASTMD 2240 in the direction of the spacer yarns by using Asker C durometer available from KOBUNSHI KEIKI Co, Ltd.

The tensile strength of the 3D fabric reinforced PU composite is measured in the direction of the spacer yarns according to the test standard of DIN 53504 by using Zwick/Roell testing machine available from Zwick Roell Instrument & Technology Co, Ltd.

The tear strength of the 3D fabric reinforced PU composite is measured in the direction of the spacer yarns according to the test standard of DIN ISO 34-1 method A by using Zwick/Roell testing machine available from Zwick Roell Instrument & Technology Co, Ltd.

The elongation of the 3D fabric reinforced PU composite is measured in the direction of perpendicular to the spacer yarns according to the test standard of DIN 53504 by using Zwick/Roell testing machine available from Zwick Roell Instrument & Technology Co, Ltd.

The flexibility is measured by bending the 3D fabric reinforced PU composite by hand. If the test plate could be bent over 30° in the direction of perpendicular to the spacer yarns, the flexibility is good; if the test plate could not be bent over 30°, the flexibility is poor.

For the polyester recipe, a hydrolysis test is also carried out. The hydrolysis test of the 3D fabric reinforced PU composite is measured according to the test standard of DIN EN ISO 20344.

2. Procedure to Prepare the Composites

A component (for the sports system, keeping A component at 35° C.; for the chappal system, keeping A at room temperature, 20° C.) and B component shown in Table 1 and 2 were prepared respectively by mixing the corresponding components. At the same time, the temperature of the mould was kept at 25 to 50° C. (for the sports system, the mould temperature is 23° C.; for the chappal system, the mould temperature is 50° C.). Then 65 g of A component and 45 g B of component were put into one plastic cup, mixed for from 7 to 8 seconds with a mixing machine (the type of EWTHV 05, vollrath mixer). 62 g of the mixture of A and B components was put into the mould. Then a 3D fabric made from PET available from Donghua University was put into the mixture in a manner that the top and bottom layers of the fabric are parallel to the bottom of the mould, and the fabric is placed in the center of the mould. Then the mould was closed. Five minutes later, the mould was open and the sample was taken out, and kept at room temperature for 24 h to cure.

TABLE 1

Basic recipe (based on chappal)

| A-component | Description | Functionality | MW | OH value [mg KOH/g] | Parts |
|---|---|---|---|---|---|
| H7220 | Polyester polyol, available from BASF Polyurethane (China) Co, Ltd | 2.06 | 1600 | 72 | 84.95 |
| GBL | Plasticizer, available from BASF Polyurethane (China) Co, Ltd | | | | 3 |
| MEG | Chain extender, available from BASF Polyurethane (China) Co, Ltd | | | | 10 |
| Dabco EG | Catalyst, available from Air Products & Chemicals (China) Investment Co., Ltd. | | | | 0.95 |
| Dabco DC 193 | Surfactant, available from Air Products & Chemicals (China) Investment Co., Ltd. | | | | 0.3 |
| Water | Blowing agent | | | | 0.8 |

| B-component | NCO |
|---|---|
| ISO 187/26 available from BASF Polyurethane Specialties (China) Company Ltd. | 21.23% |

TABLE 2

| A-component | Description | Functionality | MW | OH value [mg KOH/g] | Parts |
|---|---|---|---|---|---|
| | Basic recipe (sports recipe) | | | | |
| PTHF 2000 | Polyether polyol, available from BASF Polyurethane (China) Co, Ltd | 2 | 2000 | 56.1 | 96.2 |
| Lupragen N203 | Catalyst, available from BASF Polyurethane (china) Co, Ltd | | | | 0.8 |
| Dabco DC 193 | Surfactant, available from Air Products & Chemicals (China) Investment Co., Ltd. | | | | 0.3 |
| Tegostab B 8491 | Surfactant, available from Evonik Specialty Chemicals (Shanghai) Co, Ltd | | | | 1.00 |
| Water | Blowing agent | | | | 1.20 |
| DEOA | Crosslinker, available from BASF Polyurethane (China) Co, Ltd | | | | 0.50 |
| B-component | | | | NCO | |
| ISO 137/53 available from BASF Polyurethane Specialties (China) Company Ltd. | | | | 18.5% | |

Tests were carried out according to the standards described above on the obtained plates to determine the density, hardness, tensile strength, elongation, and tearing strength. For the polyester system, the mechanical properties before and after hydrolysis were also measured. The results are shown in Table 3 and 4, respectively.

TABLE 3

The properties of the plates based on the chappal recipe (Polyester system)

| | Recipe | Original | Fabric Thickness 0.26 cm | Fabric Thickness 0.56 cm |
|---|---|---|---|---|
| Before hydrolysis | Average Density (g/cc) | 0.38 | 0.37 | 0.39 |
| | Hardness (shore A) | 50~55 | 50~53 | 52~55 |
| | Tensile (N/mm²) | 5.1 | 3.2 | 7.8 |
| | Elongation (%) | 293 | 119 | 27 |
| | Tear (N/mm) | 5.4 | 15.1 | 16.9 |
| After hydrolysis | Tensile (N/mm²) | 5.1 | 1.6 | 6.4 |
| | Elongation (%) | 348 | 116 | 36 |
| | Tear (N/mm) | 5.9 | 14.1 | 19.3 |

TABLE 4

The properties of the plates based on sports recipe (Polyether system)

| Recipe | Original | Fabric Thickness 0.26 cm | Fabric Thickness 0.56 cm |
|---|---|---|---|
| Density (g/cc) | 0.35 | 0.37 | 0.38 |
| Hardness (Asker C) | 47 | 49~51 | 53~56 |
| Tensile (N/mm2) | 2.1 | 2.5 | 6.8 |
| Elongation (%) | 455 | 168 | 30 |
| Tear (N/mm) | 2.4 | 10.3 | 15.8 |

As can be seen from Table 3 and 4, by being reinforced with the 3D fabric, the tensile strength and tear strength of the resulted plates were increased greatly.

The test plates obtained from the both recipes could be bent over 30° in the direction of perpendicular to the spacer yarns, while hardly be bent in the other two directions perpendicular to it.

The improved mechanical properties of the composite can prolong the sole life, and the anisotropy helps to make the ankle to be stable and comfort during walking or running. Moreover, the appearance of this composite also allows the freedom for design of the shoes.

The invention claimed is:

1. A 3D spacer fabric reinforced PU composite, which is made from a polyurethane (PU) foam reinforced by a 3D spacer fabric,
   wherein the 3D spacer fabric comprises a first layer of material that is separated from a second layer of material by spacer yarns, wherein an inclination angle of the spacer yarns is from 65 to 75°, and
   wherein the polyurethane is prepared by reacting
   (a) a di- or polyisocyanate,
   (b) a polyether polyol or polyester polyol and
   (c) a blowing agent.

2. The composite according to claim 1, wherein a functionality of the polyether polyol or the polyester polyol is from about 1.7 to about 2.5.

3. The composite according to claim 1, wherein a hydroxyl number of the polyether polyol or the polyester polyol is from about 50 to about 270 mg KOH/g.

4. The composite according to claim 1, wherein a molecular weight of the polyether polyol or the polyester polyol is from about 500 to about 6000.

5. The composite according to claim 1, wherein a polydispersion index of the polyether polyol or polyester polyol is within a range from about 0.8 to about 1.3.

6. The composite according to claim 1, wherein the fabric is made from polyethylene terephthalate (PET), polybutylene terephthalate (PBT), nylon or polyacrylonitrile.

7. The composite according to claim 1, wherein a thickness of the 3D spacer fabric is from about 2 to about 15 mm.

8. A process for preparing the composite according to claim 1, which comprises adding the 3D spacer fabric, the di- or polyisocyanate, the polyether polyol or polyester polyol, and the blowing agent into a mould and then foaming.

9. The process according to claim 8, comprising mixing the di- or polyisocyanate, the polyether polyol or polyester polyol, and the blowing agent to form a mixture, then infusing the mixture into the 3D spacer fabric which has been put into a mould.

10. The process according to claim 9, wherein the infusion is carried out by using vacuum-assisted resin transfer molding (VARTM) or by direct casting.

11. The process according to claim 9, wherein the infusion is carried out in such a way that the reaction mixture flows through the 3D spacer fabric in a spacer yarn direction.

12. A footwear comprising the composite according to claim 1.

13. The composite according to claim 1, wherein a functionality of the polyether polyol or the polyester polyol is from about 1.8 to about 2.4.

14. The composite according to claim 1, wherein a hydroxyl number of the polyether polyol or the polyester polyol is from about 55 to about 200 mg KOH/g.

15. The composite according to claim 1, wherein a molecular weight of the polyether polyol or the polyester polyol is from about 600 to about 4000.

16. The composite according to claim 1, wherein a polydispersion index of the polyether polyol or polyester polyol is within a range from about 0.9 to about 1.2.

17. The composite according to claim 1, wherein the fabric is made from PET and PBT.

18. The composite according to claim 1, wherein a thickness of the 3D spacer fabric is from about 3 to about 12 mm.

19. A shoe sole comprising the composite according to claim 1.

* * * * *